Patented Feb. 9, 1926.

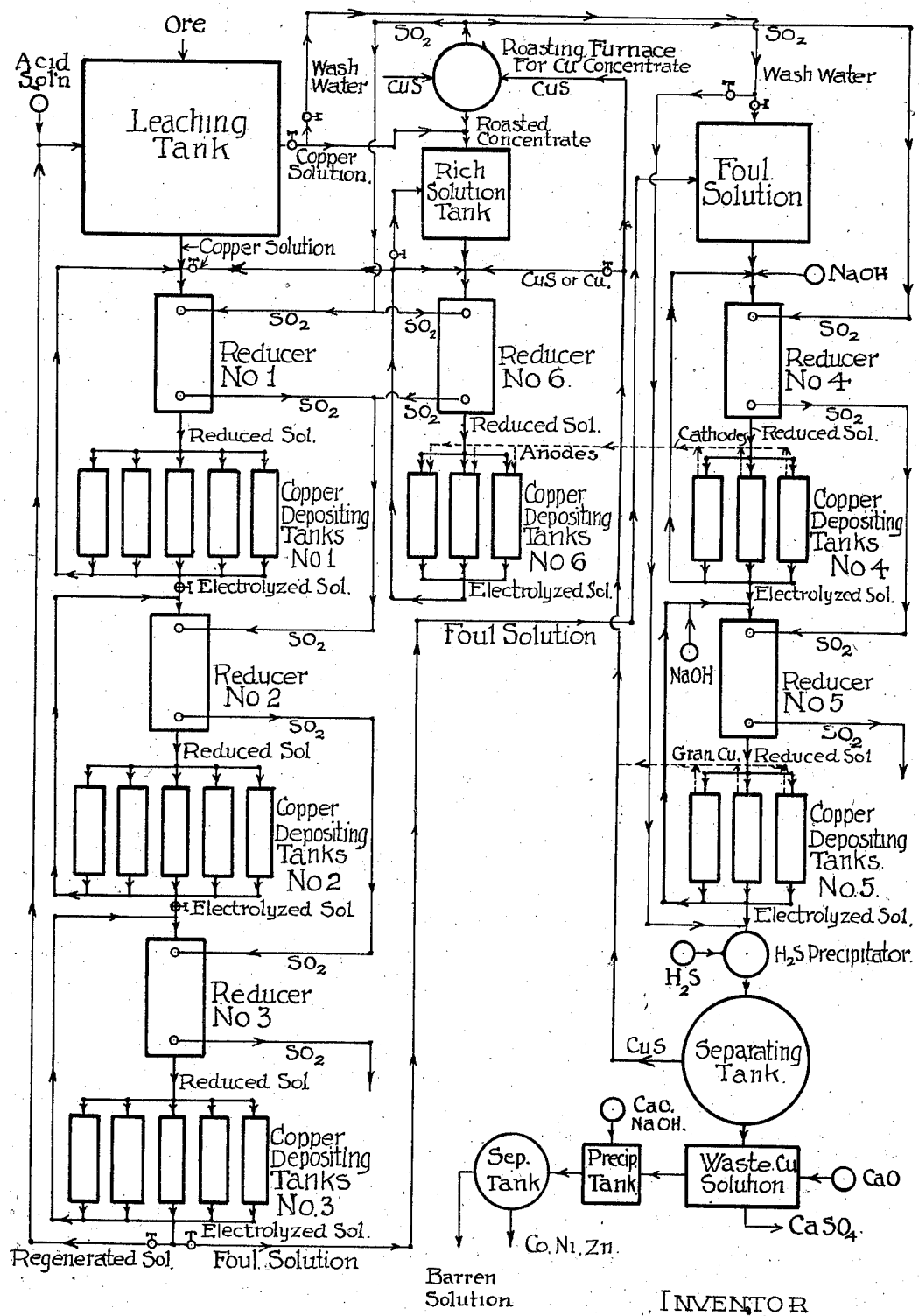

1,572,114

UNITED STATES PATENT OFFICE.

WILLIAM E. GREENAWALT, OF DENVER, COLORADO.

METALLURGICAL PROCESS.

Application filed September 2, 1924. Serial No. 735,303.

*To all whom it may concern:*

Be it known that I, WILLIAM E. GREEN-AWALT, a citizen of the United States, residing in the city and county of Denver and State of Colorado, have invented certain new and useful Improvements in Metallurgical Processes, of which the following is a specification.

The invention is more specifically directed to the extraction of copper from its ores by leaching and electrolysis, and may be considered as an improvement on processes patented by me as set forth in Patents No. 1,353,995, Sept. 28, 1920, and No. 1,357,495, Nov. 2, 1920, and in my pending applications, Serial No. 486,817, filed July 22, 1921 (Patent No. 1,509,947, Sept. 30, 1924), and Serial No. 689,613, filed Jan. 31, 1924 (Patent No. 1,542,935, June 23, 1925). The process is applicable to copper ores alone, or to copper ores containing other metals, altho it is not intended to limit its use to any particular application.

In the treatment of copper ores by leaching and electrolysis, as set forth, for example in Patent No. 1,353,995, it has been found that excellent results are obtained by passing the leach copper solution through a series of electrolytic units comprising a reducer and a group of cells, or electrolyzers, in a sort of compound circuit, which consists in circulating the solution or electrolyte in a practically closed circuit of each electrolytic unit, and progressively advancing a portion of the solution or electrolyte, which may be termed the "advance flow," through the series of electrolytic units, and then back to the leaching tank, where more copper is taken into solution and the complete cycle is repeated.

In carrying out this general process a certain amount of impure or foul solution or electrolyte has to be discarded and an equal amount of water, preferably in the form of wash water, has to be added to maintain the solution at a certain standard of impurity of soluble salts. In doing this, copper, and sometimes other metals, have to be recovered from the discarded electrolyte, and from the lean wash waters, resulting from leaching the ore.

The present process pertains more particularly to the treatment of the discarded foul solutions and to the lean wash water to recover the copper from these solutions as the relatively pure electrolytic metal.

The process may best be described by referring to the accompanying drawing, which represents a flow sheet of the invention in diagrammatic plan.

The copper ore, crushed to suitable fineness, is treated in the leaching tank with a dilute acid solution to extract the copper, preferably in the form of sulphate. As all copper ores contain iron, the copper sulphate solution will be contaminated with iron sulphate, and this iron sulphate may become very injurious in the electrolytic deposition of the copper. When the copper sulphate solution, containing ferrous sulphate, is electrolyzed to deposit the copper, acid is regenerated and at the same time some of the ferrous sulphate is oxidized to the ferric sulphate, and this ferric sulphate coming in contact with the deposited copper at the cathode, re-dissolves the copper practically in proportion to the amount of ferric iron in the electrolyte. The amount of ferric iron in the electrolyte should not exceed 0.25% for good work; 0.5% has a decided detrimental effect; and when the amount of ferric iron reaches 1.0% the process becomes so greatly impaired as to make it impractical. While ferric iron in the electrolyte is highly detrimental, ferrous iron is practically harmless, and may be decidedly beneficial, since it is capable of acting energetically as a depolarizing agent in the deposition of the copper.

Sulphur dioxide is preferred as the general reducing agent for the ferric iron in the electrolyte resulting from the deposition of the copper from a copper solution containing salts of iron. Sulphur dioxide is more effective as a reducing agent in neutral or slightly acid solutions than in solutions high in acid. In the deposition of copper from leach solutions, better efficiencies are obtained with rich than with lean solutions. The significance of these points may be illustrated as follows: Suppose the solution from the leaching tank contains 4.0% copper and it is desired to electrolytically precipitate the copper so that the depleted solution will contain 1.0% copper before it is returned to the leaching tank in the cyclic operation of the process: it is evident that the copper will have to be precipitated from a solution containing only about 1.0% copper, and about 8.25% acid, assuming that 2.75 lbs. of acid are regenerated per lb. of copper deposited. Under these conditions, the current efficiency would be low, the reduction of the ferric iron would be extremely difficult, and the deposited copper would be quite impure. To meet the conditions indicated, it is preferred to proceed as follows:

The neutral or slightly acid leach solution from the leaching tank, which for illustration purposes, may be assumed to contain 4.0% copper and some soluble iron and other salts, flows into the $SO_2$ reducer No. 1, where it is treated with sulphur dioxide from the roasting furnace to reduce the harmful ferric iron to the harmless ferrous iron, with the simultaneous regeneration of an equivalent of acid. The reduced solution flows into the copper depositing tanks No. 1, where copper is deposited and acid and ferric iron regenerated. The solution from the copper depositing tanks, or electrolyzers, is then returned in a sort of closed circuit, to the reducer No. 1, where the ferric iron formed by the electrolysis, is again reduced. The solution issuing from the electrolyzers should not exceed 0.25% ferric iron for good work. The process is regulated so that a portion of the solution—the advance flow—goes to reducer No. 2, and this solution will contain about 3.0% copper and about 2.75% acid. From reducer No. 2, it flows into the copper depositing tanks No. 2, and the solution is returned to the reducer from the electrolyzers, while another portion—the advance flow—containing about 2.0% copper, and 5.50% acid is passed on to reducer No. 3, and from the reducer to the copper depositing tanks No. 3, and from the tanks back to the reducer, while another portion—the advance flow—is returned to the ore, and this advance flow will contain about 1.0% copper and about 8.25% acid. Most of the copper produced will be produced in this way, and will represent the major output of the plant.

In time, the solution being circulated, as indicated, will become charged with impurities, such as iron, zinc, cobalt, nickel, and other salts, which necessitates the withdrawal of a certain amount of the foul solution, and the addition of a certain amount of water, preferably as wash water, to keep the solution at a certain standard for satisfactory operation.

A relatively small continuous stream of foul solution is diverted from the main leaching and electrolytic circuit, or circuit No. 1, to a secondary circuit, or circuit No. 2, where most of the remaining copper is deposited from the foul solution electrolytically, and the remaining small portion is then precipitated chemically, before the solution is wasted, or treated to recover other metals.

The foul solution, under the assumed condition for illustration purposes, will contain about 1.0% copper and about 8.25% acid, and iron and other salts. As already indicated, such a solution presents difficulties in electrolysis, due largely to the difficulty encountered in reducing the ferric iron formed by the deposition of the copper. It is preferred therefore to mix a certain amount of wash water from the leaching tank with the foul electrolyte to reduce both the acidity and the percentage of impurities. Some of the excess acid may be neutralized by adding lime or caustic soda to the foul electrolyte. With the acid reduced, the ferric iron is much more easily reduced. The solution flows from the foul solution tank, into reducer No. 4, where it is treated with a reducing agent, such as sulphur dioxide, after which it flows into the copper depositing tanks No. 4, where a certain amount of copper is deposited with the simultaneous regeneration of acid and ferric salts. The solution is then returned to the reducer and the cycle continued, while a portion—the advance flow—goes to the reducer No. 5, and from there to the copper depositing tanks No. 5, and the cycle repeated until most of the copper is deposited out of the solution. A neutralizing agent, such as lime or caustic soda, may be added to the electrolyte as it flows into reducer No. 4 or No. 5. Under these conditions it has been found practical to deplete the foul solutions of copper down to about 0.10%, and with a fairly high ampere efficiency. It has also been found that the copper can be deposited in fairly good hard form in the depositing tanks No. 4, with the effluent solution as low as 0.25% copper, while the copper deposited in the copper depositing tanks No. 5 is likely to be granular, or spongy, and quite impure, but the ampere efficiency can be maintained fairly good.

In depositing the copper from the foul solution, it is preferred to use insoluble cathodes, such as lead sheets. In the copper depositing tanks No. 4, the copper deposited on the lead cathodes will be firm but somewhat impure. In the copper depositing tanks No. 5, the copper deposited on the lead sheets will be granular or spongy and will not usually adhere to the lead sheet cathodes, but the copper will drop from the lead sheet cathodes from time to time, and can be accumulated in the bottom of the tanks. When the cathodes in the copper depositing tanks No. 4 have accumulated sufficient copper to make their removal desirable, the cathodes are transferred to a rich copper electrolyte, as in the copper depositing tanks No. 6, and used as anodes. In this way the impure copper from the foul solutions is re-deposited at a comparatively small expense, as the pure electrolytic metal. There is an advantage in using insoluble cathode sheets instead of copper sheets for this purpose. When the impure cathodes obtained from the foul solutions are transferred to the rich copper solution and used as anodes, the copper will be transferred to pure cathode sheets, and when all the copper is re-deposited on the pure cathode sheets, the insoluble lead sheets on which the impure copper was deposited, are again transferred to the foul solution tanks (No. 4) and the cycle repeated. If the re-solution of the copper from the impure anodes, in tanks No. 6 (transferred cathodes from tanks No. 4) is uneven, it will not make a great deal of difference. When the copper is removed from the lead sheets, the lead sheets will act as insoluble anodes, but as the e. m. f. required to deposit copper from solutions with insoluble anodes, is about 1.75 volts, under the assumed conditions, and about 0.3 volts for soluble anodes, the impure copper will be removed from the lead sheets before the lead sheets, or exposed portions of them, will act as insoluble anodes.

The copper deposited in tanks No. 5, is accumulated in the bottom of the tanks and removed from time to time. This granular or spongy copper is preferably applied to the rich electrolyte in reducer No. 6, where it is re-dissolved by using it as a reducing agent to reduce the ferric iron formed in the copper depositing tanks No. 6. If the electrolyte in reducer No. 6 and tanks No. 6, or electrolytic circuit No. 3, becomes too acid, the loosely deposited copper from tanks No. 5 may be roasted, and the resulting copper oxide used to regulate both the acidity and copper content of the electrolyte in circuit No. 3. The electrolyte in circuit No. 3 is preferably a portion of the richer and purer copper solution from the ore leaching tank or from circuit No. 1, and both the acidity and the copper content of the electrolyte in circuit No. 3 is preferably at least partly controlled by roasted concentrated copper material, such as copper sulphide concentrate, metallic copper, or copper sulphide obtained as a precipitate in the treatment of foul electrolyte or waste lean wash waters. The reduction of the ferric iron in circuit No. 3 may be accomplished either with sulphur dioxide, copper sulphide or metallic copper precipitate. Copper sulphide precipitate is very convenient and effective for this purpose and is preferred; the reducing action is positive, the ampere efficiency is high, and the deposited copper is very pure.

The effluent solution from electrolytic circuit No. 2, containing about 0.10% copper, flows into the $H_2S$ precipitator, where the remaining copper is precipitated with hydrogen sulphide. The sulphide precipitate and the copper-barren solution flows into a separating tank, where the CuS is separated from the solution. The CuS is transferred to the reducer No. 6, or, if it is desired to roast it and convert it into the form of oxide, it may be conducted to the roasting furnace, and roasted either alone or mixed with copper sulphide concentrate, and the roasted material used to reduce the acidity and increase the copper content of the electrolyte. The copper barren solution then flows to waste, or if the solution contains other valuable metals, such as cobalt, nickel, or zinc, the excess acid is neutralized, and the impurities, such as iron and aluminum, are precipitated, preferably with lime. The neutralized and purified solution is then treated to recover the cobalt, nickel, or zinc, by any of the known methods, such as by electrolysis, evaporation, or by precipitation with a precipitant such as lime or sodium hydroxide. The precipitate is then separated from the barren solution and the solution wasted.

In leaching copper ore with an acid solution, considerable wash water is produced which is too lean to add to the electrolyte, and yet contains sufficient copper to make its recovery desirable. This lean wash water is conducted from the leaching tank to the $H_2S$ precipitator, where the copper is precipitated the same as that of the waste foul electrolyte.

It is desirable to maintain the electrolyte in circuit No. 3 at a rough standard, at least in respect to acidity and copper content; this may be done, in part at least, by diverting a portion of the solution from circuit No. 3 back to the leaching tank or circuit No. 1, while a corresponding amount of richer and purer solution from the leaching tank or circuit No. 1 is flowed into circuit No. 3. This will always assure a suitable electrolyte in circuit No. 3. This is best done by maintaining a small continuous stream of new solution from circuit No. 1 to circuit No. 3, and of old solution from circuit No. 3 back to circuit No. 1. Circuit No. 3 is used largely to refine the impure copper precipitated either electrolytically or chemically from the foul waste electrolyte or lean wash waters, while at the same time some of the copper is deposited from the solution itself. All of the copper produced by this process is produced as the electrolytic metal.

The process has been described with reference to sulphate solutions; it is evident that it is applicable to chloride and other solutions.

The number of reducers and electrolyzers composing the series of reducers and electrolyzers in the precipitation of the copper from the foul solutions may be two or more; usually two will give the most satisfactory results.

It is preferred to precipitate copper from the lean wash waters and foul solutions after electrolysis, with hydrogen sulphide, although other precipitants, such as metallic iron, may be used. When hydrogen sulphide is used as the precipitant no more impurities are added to the solution, while if iron is used as the precipitant an equivalent of iron goes into solution, and if other metals are to be recovered from the copper barren solution, it would be necessary to first eliminate this additional iron.

The copper of the precipitate, used either as Cu or CuS goes into solution in circuit No. 3 by acting on the ferric iron formed by the electrolysis in a solution containing salts of iron. If the precipitate is roasted the resulting copper oxide acts both on the acid and ferric iron.

I claim:—

1. A process comprising leaching copper ore with an acid solution to extract the copper, alternately subjecting the resulting copper solution to the action of a reducing agent and to the action of electrolysis to deposit the copper and regenerate acid and repeating the cycle of leaching, reduction, and electrolysis until the solution becomes fouled with impurities, then diverting a portion of the foul solution to a separate electrolytic circuit, reducing the acidity of the diverted foul solution, and then again alternately subjecting the diverted foul solution to the action of a reducing agent and to the action of electrolysis.

2. A process comprising leaching copper ore with an acid solution to extract the copper, electrolyzing the resulting copper solution to deposit the copper and regenerate acid, returning the regenerated acid solution to the ore and repeating the cycle until the solution becomes charged with impurities, then diverting a portion of the foul solution, to a separate electrolytic circuit, comprising a reducer and an electrolyzer, and alternately subjecting the diverted foul solution to the action of sulphur dioxide in the reducer and to the action of electrolysis to deposit the copper from the diverted foul solution.

3. A process comprising leaching copper ore with an acid solution to extract the copper, electrolyzing the resulting copper solution to deposit the copper and regenerate acid, returning the regenerated acid solution to the ore and repeating the cycle until the solution becomes fouled with impurities, then diverting a portion of the foul solution to a separate electrolytic circuit, reducing the acidity of the foul solution, and alternately subjecting it to the action of sulphur dioxide and to the action of electrolysis until the diverted foul solution is sufficiently depleted in copper.

4. A process comprising leaching copper ore with an acid solution to extract the copper, electrolyzing the resulting copper solution to deposit the copper and regenerate acid, returning the regenerated acid solution to the ore and repeating the cycle until the solution becomes fouled with impurities, then diverting a portion of the foul solution to a separate electrolytic circuit, adding wash water from the leaching tank to the diverted foul solution, and then subjecting the resulting mixed solution to the alternate action of sulphur dioxide and electrolysis until the solution is sufficiently depleted in copper.

5. A process comprising leaching copper ore with an acid solution to extract the copper, electrolyzing the resulting copper solution to deposit the copper and regenerate acid, returning the regenerated acid solution to the ore and repeating the cycle until the solution becomes fouled with impurities, then diverting a portion of the foul solution to a separate electrolytic circuit composed of a plurality of electrolytic units each comprising a reducer and an electrolyzer, precipitating a portion of the copper as an adherent deposit on suitable cathodes in one electrolytic unit, and depositing another portion of the copper as a non-adherent deposit on suitable cathodes in another electrolytic unit.

6. A process comprising leaching copper ore with an acid solution to extract the copper, electrolyzing the resulting copper solution to deposit the copper and regenerate acid, returning the regenerated solution to the ore and repeating the cycle until the solution becomes fouled with impurities, then diverting a portion of the foul solution to a separate electrolytic circuit, depositing a portion of the copper from the foul solution on insoluble cathode sheets as impure copper, removing the impure copper cathodes from the foul electrolyte and transferring them to a purer copper solution as anodes to re-deposit the impure copper as the pure electrolytic metal.

7. A process comprising leaching copper ore with an acid solution to extract the copper, electrolyzing the resulting copper solution to deposit the copper and regenerate acid, returning the regenerated solution to the ore and repeating the cycle until the solution becomes fouled with impurities, then diverting a portion of the solution to a separate electrolytic circuit and alternately subjecting the foul solution to the action of a reducing agent and to the action of electrolysis to deposit a portion of the copper from the foul solution as impure cathode copper, precipitating another portion of the copper from the electrolyzed foul solution with a chemical precipitant, removing the impure copper cathodes from the foul electrolyte and transferring them to a richer and purer copper solution as anodes to re-deposit the impure copper as the pure electrolytic metal, and applying the chemically precipitated copper from the foul solution to the electrolyte in which the copper of the impure copper cathodes is converted into the pure electrolytic metal.

8. A process comprising leaching copper ore with an acid solution to extract the copper, electrolyzing the resulting copper solution to deposit the copper and regenerate acid, returning the regenerated acid solution to the ore and repeating the cycle until the solution becomes fouled with impurities, then diverting a portion of the solution to a separate electrolytic circuit and alternately subjecting the diverted foul solution to the action of a reducing agent and to the action of electrolysis to deposit a portion of the copper from the foul solution as impure copper on insoluble cathode sheets, removing the impure copper cathodes from the foul electrolyte and transferring them to a richer and purer copper electrolyte as anodes to redeposit the copper of the impure copper cathodes as the pure electrolytic metal, and then returning the insoluble cathode sheets to the foul electrolyte and repeating the cycle.

9. A process of precipitating copper from impure solutions obtained from leaching ores and containing salts of iron comprising, precipitating a portion of the copper as the pure electrolytic metal from the relatively pure solution, precipitating a portion of the copper from the foul solutions as the relatively impure electrolytic metal, and precipitating the remaining portion of the copper from the impure solution chemically, re-depositing the relatively impure electrolytic copper as the relatively pure electrolytic metal in the relatively pure leach copper solution as the electrolyte, and applying the chemically precipitated copper to said electrolyte.

10. A process comprising leaching copper ore with an acid solution to extract the copper, electrolyzing the resulting copper solution to deposit the copper and regenerate acid, returning the regenerated acid solution to the ore and repeating the cycle until the solution becomes foul with impurities, then diverting a portion of the solution to a separate foul solution electrolytic circuit composed of a series of electrolytic units each comprising a reducer and an electrolyzer, applying sulphur dioxide to the reducers, circulating the solution in a closed circuit between the reducer and electrolyzer of the respective electrolytic units, and progressively advancing the solution through the series of foul solution electrolytic units.

11. A process of removing residual copper from foul electrolytes obtained from depositing copper from leach solutions comprising, depositing the residual copper on insoluble cathode sheets as the impure metal, and then transferring the copper cathodes so produced to a rich copper solution, and regulating the acidity and copper content of the rich copper electrolyte by treating it with concentrated copper oxide.

12. A process comprising leaching copper ore with an acid solution to extract the copper, electrolyzing the resulting copper solution to deposit the copper and regenerate acid, returning the regenerated acid solution to the ore and repeating the cycle until the solution becomes fouled with impurities, then diverting a portion of the solution to a separate electrolytic circuit and alternately subjecting the foul solution to the action of sulphur dioxide and electrolysis to deposit the copper out of the foul solution and regenerate acid, and applying a neutralizing agent to the foul electrolyte to reduce its acidity.

13. A process comprising leaching copper ore containing other metals with an acid solution to extract the copper, electrolyzing the resulting copper solution to deposit the copper and regenerate acid, returning the regenerated solution to the ore and repeating the cycle until the solution becomes fouled with impurities, then diverting a portion of the solution to a separate electrolytic circuit and alternately subjecting the foul solution to the action of sulphur dioxide and electrolysis to deposit the copper out of the foul solution and regenerate acid, and then when the solution is sufficiently depleted in copper by electrolytic precipitation, chemically precipitating the remaining copper, applying a neutralizing agent to the resulting solution, and then recovering other valuable metals from the solution.

14. A process comprising leaching copper ores with an acid solution to extract the copper, electrolyzing the resulting copper solution to deposit the copper and regenerate acid, returning the regenerated acid solution to the ore and repeating the cycle of leaching and electrolysis until the solution becomes fouled with impurities, withdrawing the foul solution from the leaching and electrolytic circuit, precipitating the copper from the foul solution, applying the copper precipitate to a portion of the leach solution as an electrolyte and electrolyzing the solution, and regulating said electrolyte by adding to it solution from the leaching circuit and returning an equivalent of said electrolyte back to the leaching circuit.

15. A process of leaching copper ores and recovering the copper from the leach solution by electrolysis comprising, depositing a portion of the copper in a primary leaching and electrolytic circuit, depositing another portion of the copper from the impure solutions obtained from the primary circuit in a second electrolytic circuit, and maintaining a third electrolytic circuit where the copper obtained from the foul solution is re-deposited using a portion of the leach solution from the primary circuit as an electrolyte, and regulating said electrolyte by adding to it solution from the primary leaching and electrolytic circuit and returning an equivalent of said electrolyte back to the primary leaching and electrolytic circuit.

16. A process comprising leaching copper ore with an acid solution to extract the copper, electrolyzing the resulting copper solution in a primary leaching and electrolytic circuit to deposit the copper and regenerate acid, returning the regenerated acid solution to the ore and repeating the cycle until the solution becomes fouled with impurities, precipitating copper from waste foul electrolyte or from lean wash water, applying the copper precipitate to a refining electrolytic circuit, and maintaining a flow of copper solution from the primary circuit to the refining circuit and from the refining circuit back to the primary circuit.

17. A process comprising leaching copper ore with an acid solution to extract the copper, electrolyzing the resulting copper solution in a primary leaching and electrolytic circuit to deposit the copper and regenerate acid, returning the regenerated acid solution to the ore and repeating the cycle until the solution becomes fouled with impurities, precipitating copper from lean solutions, applying the copper precipitate to a separate electrolytic circuit as a refining circuit using leach solution containing salts of iron as the electrolyte, circulating a portion of the solution between the primary circuit and the refining circuit, and in part regulating the electrolyte of the refining circuit with oxidized concentrated copper material.

18. A process comprising leaching copper ore with an acid solution to extract the copper, electrolyzing the resulting copper solution to deposit the copper and regenerate acid, returning the regenerated acid solution to the ore and repeating the cycle until the solution becomes fouled with impurities, then diverting a portion of the solution to a separate electrolytic circuit, reducing the acidity of the diverted solution, and then alternately subjecting it to the action of electrolysis, sulphur dioxide, and a neutralizing agent other than a copper compound to neutralize the acid regenerated in the deposition of the copper from the diverted foul solution.

19. A process comprising leaching copper ore with an acid solution to extract the copper, electrolyzing the resulting copper solution to deposit the copper and regenerated acid, returning the regenerated acid solution to the ore and repeating the cycle until the solution becomes fouled with impurities, then diverting a portion of the solution to a separate electrolytic circuit consisting of a plurality of electrolytic units each comprising a reducer and an electrolyzer, electrolytically precipitating a portion of the copper from the foul solution in one of the electrolytic units, and then precipitating another portion of the copper from said foul solution in another electrolytic unit.

20. A process comprising leaching copper ore with an acid solution to extract the copper, electrolyzing the resulting copper solution in a primary electrolytic circuit to deposit the copper and regenerate acid, returning the regenerated acid solution to the ore, diverting a portion of the copper solution to a different or secondary electrolytic circuit, chemically precipitating copper from wash waters or waste foul solutions, and applying the chemically precipitated copper to the secondary electrolytic circuit.

21. A process comprising leaching copper ore with an acid solution to extract the copper, electrolyzing the resulting copper solution to deposit the copper and regenerate acid, returning the regenerated acid solution to the ore and repeating the cycle until the solution becomes fouled with impurities, then diverting a portion of the solution to a separate electrolytic circuit, reducing the acidity of the foul diverted solution, and then alternately subjecting the diverted foul solution reduced in acidity to the action of electrolysis and to the action of a neutralizing agent other than a copper compound to neutralize the acid regenerated in the deposition of the copper from the diverted foul solution.

22. A process comprising leaching copper ore with an acid solution to extract the copper, electrolyzing the resulting copper solution in a primary leaching and electrolytic circuit to deposit the copper and regenerate acid, returning the regenerated acid solution to the ore and repeating the cycle until the solution becomes fouled with impurities, then diverting the foul solution to a foul solution electrolytic circuit and depositing the copper from the foul solution on lead or other insoluble electrode sheets as cathodes, then transferring the lead-copper cathodes to the primary electrolytic circuit and electrically connecting them up as anodes, and then when the copper has been removed from the lead-copper anodes returning the lead sheets to the foul solution circuit and again electrically connecting them up as cathodes.

23. A process comprising leaching copper ore with an acid solution to extract copper, electrolyzing the resulting copper solution to deposit the copper and regenerate acid, returning the regenerated acid solution to the ore and repeating the cycle until the solution becomes fouled with impurities, then diverting the foul solution to a foul solution electrolytic circuit and depositing the copper from the foul solution on lead or other insoluble electrode sheets as cathodes, then removing the lead-copper cathodes from the foul solution circuit and placing them in a relatively pure electrolyte and using them as anodes, and then when the copper is removed from the lead or other insoluble electrode sheets returning the lead sheets to the foul solution circuit and again using the lead sheets as cathodes to receive a fresh deposit of impure copper.

WILLIAM E. GREENAWALT.